Dec. 25, 1962  K. SCHRÖTER ETAL  3,070,390
JOURNAL SHAFT COUPLING
Filed Aug. 17, 1960

INVENTOR.
KURT SCHRÖTER
BERNHARD WALTERSCHEID-MÜLLER
By Toulmin & Toulmin
Attorneys

United States Patent Office 3,070,390
Patented Dec. 25, 1962

3,070,390
JOURNAL SHAFT COUPLING
Kurt Schröter and Bernhard Walterscheid-Müller, Lohmar, Rhineland, Germany, assignors to Jean Walterscheid Kommanditgesellschaft, Lohmar, Rhineland, Germany
Filed Aug. 17, 1960, Ser. No. 50,132
Claims priority, application Germany Aug. 19, 1959
2 Claims. (Cl. 287—53)

The present invention relates to couplings and more in particular to a journal shaft coupling, especially for use with tractors or other heavy machinery.

It is old to provide rapidly releasable couplings for journal shafts in tractors or other heavy machinery. These known couplings comprise locking means adapted to engage an annular recess in the journal shaft. The known coupling means of this type suffer from the disadvantage that the contact area between the coupling members, e.g. the locking means and the annular recess, is comparatively small, since only a linear or only a point contact is established. It therefore becomes necessary to provide coupling members of special or hardened wear-resistant material. Even so, the coupling members are subject to considerable wear, particularly if axial shocks occur frequently.

It has also already been proposed to provide tangentially acting coupling members of the locking pin type, or even a plurality of such locking pins with a view to distributing more evenly the load and reducing the consequent wear. This is complicated, expensive, and still does not sufficiently reduce the wear, in view of the mere linear- or point-contact areas of the coupling members.

With the foregoing in mind the objects of the present invention are to provide a journal shaft coupling of the type comprising a tangentially acting locking pin adapted to engage an annular groove, wherein a more than mere linear- or point-contact is obtained between the coupling members, and wherein, consequently, the wear of the latter is greatly reduced and the service life prolonged, and which journal shaft coupling can be manufactured in a simple, easy, and inexpensive manner.

These objects are achieved by the journal shaft coupling of the present invention according to which the journal shaft has an annular groove adapted to receive a locking pin, which latter is slidably provided in a boring of the hub of a journal fork. The locking pin extends tangentially to the journal shaft and supports an arc-shaped bulged portion arising from a flat portion and adapted for a surface-type contact with the annular groove of the shaft. The length of the arc of contact of the bulged portion with the groove of the shaft should be in the range of about 15 to 30°, measured circumferentially of the shaft.

The locking pin may have another flat portion on the opposite side thereof for receiving a stop pin positioned transversely thereto.

The invention will be more fully appreciated upon the following description of the accompanying drawings, wherein.

Figure 1:
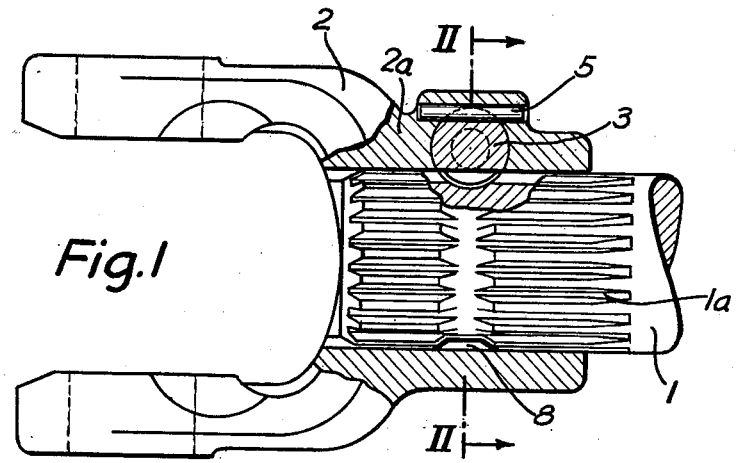
FIGURE 1 is a partly sectional view of the journal shaft coupling according to the invention.
Figure 2:
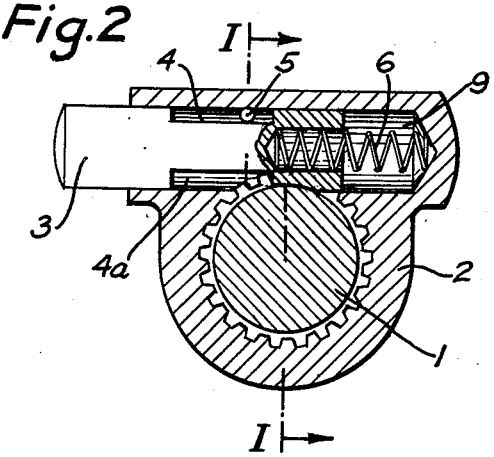
FIGURE 2 is a cross-sectional view, taken along lines II—II in FIGURE 1, of the journal shaft coupling according to the invention.
Figure 3:
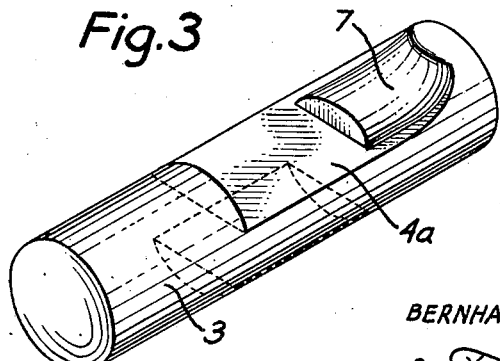
FIGURE 3 is a perspective view of the locking pin in the journal shaft coupling according to the invention.

More in detail, FIGURES 1 and 2 show a journal shaft stud 1 having a plurality of wedge portions 1a and an annular groove 8. The journal shaft stud supports the hub 2a of a journal fork 2. Hub 2a has a transverse boring 9 within which latter there is slidably provided a locking pin 3. As will be particularly noted in FIGURE 2, the pin 3 extends tangentially to the journal shaft stud 1. Pin 3 has a portion of reduced width, forming flat surfaces 4, 4a, surface 4 cooperating with a stop pin 5 positioned perpendicularly to locking pin 3.

The surface 4a of pin 3 has an arc-shaped bulged portion 7. A pressure spring 6 is disposed in boring 9 and thrusts against locking pin 3.

In the position indicated in FIGURE 2, the bulged portion 7 of pin 3 engages the annular groove 8, thus forming a surface-type of contact between the journal shaft stud 1 and locking pin 3, instead of a mere linear or point-type contact. In this position of engagement the stop pin 5 prevents rotation of locking pin 3, thus affording a reliable support of journal fork 2 against axial forces.

If the locking pin 3 is displaced contrary to the pressure of spring 6, the bulged portion 7 leaves the engagement with annular groove 8, and the latter is thus released.

It has been found that the best coupling is accomplished if the locking pin 3, and particularly the bulged portion 7 thereon, is so chosen that the effective contact area between bulged portion 7 and annular groove 8 is situated on an arc having a length measured from the vertical of the locking pin axis up to the end of the engaging arc-shaped contact surface of said bulged portion in the order of from 15° to 30°.

Furthermore, the diameter of the locking pin can be at least 20% greater than the diameter of the annular groove in the journal shaft stud.

It will be understood that this invention is susceptible to modification in order to adapt it to different usages and conditions and, accordingly, it is desired to comprehend such modifications within this invention as may fall within the scope of the appended claims.

What we claim is:

1. A shaft coupling comprising a journal shaft having a plurality of parallel splines formed on one end thereof, a complementary coupling member having a hub formed with internal grooves adapted to slidably receive the splined end of the shaft, said hub having a bore extending transversely and tangentially of the shaft, the splined portion of the shaft having a circumferential groove, a spring-pressed locking pin slidable in the bore and having a flat surface parallel to its axis, said locking pin also having an arcuate bulge arising from the flat surface and adapted to fit in the groove around the shaft, said locking pin having a second flat surface parallel to the surface with the bulge, and a stop pin engaging the second flat surface to prevent rotation of the locking pin.

2. The shaft coupling of claim 1, in which the arcuate bulge contacts the surface of the groove throughout an arc of 15–30° around the axis of the shaft.

References Cited in the file of this patent

UNITED STATES PATENTS

| | | |
|---|---|---|
| 1,408,993 | Eberhardt | Mar. 7, 1922 |
| 1,499,432 | Williston et al. | July 1, 1924 |
| 2,448,278 | Ronning | Aug. 31, 1948 |
| 2,926,034 | Weaver | Feb. 23, 1960 |